United States Patent [19]

Dunwald et al.

[11] 4,096,291

[45] Jun. 20, 1978

[54] MELT COATING COMPOSITION AND COATING PROCESS

[75] Inventors: Willi Dunwald, Leverkusen; Jürgen Lewalter, Cologne; Wilfried Zecher; Wolf-Dieter Last, both of Leverkusen, all of Germany

[73] Assignee: Bayer Aktiengesellschaft, Leverkusen, Germany

[21] Appl. No.: 544,620

[22] Filed: Jan. 28, 1975

[30] Foreign Application Priority Data

Feb. 1, 1974 Germany .............................. 2404740

[51] Int. Cl.$^2$ .......................... B05D 5/12; B32B 27/06
[52] U.S. Cl. .............................. 427/120; 260/77.5 TB; 260/830 R; 260/857 R; 260/857 PE; 260/857 UN; 260/858; 260/870; 427/58; 427/116; 427/195; 427/385 A; 427/385 C; 427/388 A; 427/429; 427/430 R; 427/435
[58] Field of Search .............. 427/195, 120, 385, 388, 427/58, 116, 429, 430 R, 435; 260/77.5 TB, 830 R, 857 R, 857 PE, 857 UN, 858, 870

[56] References Cited

U.S. PATENT DOCUMENTS

| 3,321,548 | 5/1967 | Sottler ........................ 260/77.5 TB |
| 3,621,000 | 11/1971 | Schmelzer et al. ........... 260/77.5 TB |
| 3,822,240 | 7/1974 | Schmitt et al. ............... 260/77.5 TB |
| 3,830,785 | 8/1974 | Matsui et al. ................ 260/77.5 TB |
| 3,849,160 | 11/1974 | Dhein et al. .......................... 427/27 |

FOREIGN PATENT DOCUMENTS

| 679,761 | 2/1964 | Canada ........................ 260/77.5 TB |
| 1,181,844 | 11/1964 | Germany ..................... 260/77.5 TB |

*Primary Examiner*—Harry J. Gwinnell
*Attorney, Agent, or Firm*—Gene Harsh; Lawrence S. Pope; Frederick H. Colen

[57] ABSTRACT

A process for the low solvent or solvent free coating of heat resistant substrates by using a coating substance which has a melting point or range below about 200° C and which is heat crosslinkable. The substrate is coated at temperatures between about 20° and 250° C and the coating is subsequently heated to more elevated temperatures to effect crosslinking. The coating substance contains active hydrogen, preferably hydroxyl bearing compounds and blocked polyisocyanates which become reactive when the coating substance is heated to effect cross-linking. In a preferred embodiment, the blocked polyisocyanates consist of at least 40 equivalent percent alkanol or cycloalkanol blocked polyisocyanates. Also a coating substance containing at least 50 wt.% of a combination of active hydrogen, preferably hydroxyl bearing compounds and blocked isocyanates. The combination has a melting point of less than 200° C and a blocked isocyanate group to active hydrogen ratio of about 1:2 to 1:9. At least 40 equivalent percent of the blocked polyisocyanates are alkanol or cycloalkanol blocked and the remainder are blocked such that they are reactive at temperatures at least 30° C lower than the alkanol or cycloalkanol blocked polyisocyanates. The coating substance has a viscosity of less than about 40,000 cP at or below about 250° C.

17 Claims, No Drawings

MELT COATING COMPOSITION AND COATING PROCESS

FIELD OF INVENTION

This invention relates to a new process for the production of films and coatings using certain solvent-free substances which can be cross-linked by heat.

BACKGROUND OF INVENTION

In the usual process for the manufacture of lacquered wires, the wire is passed through a solution of lacquer, the excess solution picked up in the bath is removed with suitable stripper systems and the wire is then passed through a furnace shaft. The energy supplied in the furnace is first used to evaporate the lacquer solvent and then to effect cross-linking which results in film formation. To obtain lacquer layers of the usual thicknesses, this process must be repeated about 6 to 8 times. In the lacquers employed, the solvent usually amounts to more than 50% of the lacquer and, in the worst cases, to even more than 80%. This ballast, which does not take part in formation of the film, does of course have numerous disadvantages: Unnecessarily large volume, risk of fire or explosion in transport and storage, additional energy requirement for evaporation of the solvent from the lacquer film, considerable environmental pollution and considerable cost and effort to reduce the pollution to the permissible level.

Isocyanate based stoving lacquers which contain solvent and are stable in their viscosity can only be obtained from blocked isocyanates. By blocked isocyanates are meant compounds in which the isocyanate groups are inactivated by reaction with Zerewitinoff active compounds such as malonic esters, ketoximes, phenols, lactams and CH-acidic compounds. Systems of this kind have been described, for example, in German Offenlegungsschrift No. 1,644,794.

This inactivation must be maintained not only at normal temperature but also at the elevated temperatures occurring in storage and transport in order to prevent any change in viscosity or even gelling.

On the other hand, the inactivation must not be too stable because otherwise the desired cross-linking reaction with the component which contains isocyanate active groups will not occur at all in the stoving process or only too slowly to allow for any acceptable production speeds.

On account of these limitations, the choice of blocking agents which can be used for stabilizing the isocyanates used in practice nowadays is restricted to only a few substances, e.g. phenols, ketoximes or caprolactum.

If attempts are made to reduce the proportion of solvent in such lacquers insofar as the solubility of the lacquer allows this, processing difficulties arise because the solids content, viscosity, obtainable thickness of film and levelling properties correlate with each other, depending on the stripper systems employed. The possibility of obtaining a more favorable viscosity, i.e. a lower viscosity, by increasing the temperature is strictly limited because, above a certain temperature the blocking effect of the isocyanate is eliminated so that the viscosity again rises, followed by gelling.

This invention provides new coating substances which have a reliable stability at elevated temperatures, are low viscosity melts at these temperatures, can be applied to the substrate in the form of these melts and can subsequently be reactivated by increasing the temperature and thus cross-linked to films of excellent quality. Numerous advances in processing techniques are thus combined in these substances. In systems which contain solvent, there is always the risk that premature hardening of the surface will form a barrier layer for the solvents still contained in the interior. If these solvents escape due to the high vapor pressure under the conditions of stoving, craters or other faults in the lacquer layer usually occur. This risk must be countered by a special temperature distribution in the stoving shaft. These systems are therefore particularly sensitive to fluctuations in temperature and, therefore, it was not possible to increase the reaction velocity by increasing the temperature. The possibility of increasing the size of the molecule in the stoving process was therefore slight and it was therefore generally necessary to use a product which was already substantially prefinished with regard to its molecular weight.

Since this difficulty does not arise in solvent-free processes, in other words since more heat can be applied to the system without any deleterious effect, a higher reaction velocity can be obtained and consequently products with a lower molecular weight can be used. This in turn makes it possible to produce coating substances with such low viscosities that they can even be used to coat copper wire which has a diameter of less than 0.1 mm.

Another particular advantage of using solvent-free coating substances, apart from that of avoiding the difficulties of solvent recovery, is that thicker layers can be obtained with each individual application since, with the possible exception of the blocking agent, practically all the material applied to the substrate forms part of the film. The final thickness required can therefore be obtained with only a few applications and, in the ideal case, with only one application. At least in the case of wire lacquering it now becomes possible to lacquer a plurality of wires simultaneously, using an already existing lacquering plant. This opens up new possibilities for the construction of the lacquering furnace, for example, each wire can be passed through a tube which is heated by induction or, especially in the case of conductors of large cross-section, the material which is to be applied as coating may itself be heated to the required stoving temperature by high frequency heating means.

SUMMARY OF INVENTION

This invention relates to a process for the production of films and coatings by coating any heat resistant substrate with solvent-free coating substances based on combinations of blocked polyisocyanates with compounds which contain hydrogen atoms which are reactive with isocyanate groups, followed by cross-linking the resulting coating by heat, characterized in that 1. the combinations of polyisocyanates with compounds which contain hydrogen atoms reactive with isocyanate groups are combinations with a melting point or range below 200° C and the proportions of the reactants to each other are so chosen so that the equivalent ratio of blocked isocyanate groups to active hydrogen atoms is between 1:2 and 9:1;

2. the substrate is coated in a known manner at a temperature within the range of 20° to 250° C, at which temperature the coating substance has a viscosity of not more than 40,000 cP and 3. the coated substrate is subsequently heated to a temperature at which final cross-linking proceeds, accompanied by removal of the blocking agent.

The invention also relates to a solvent-free or low solvent coating substance which can be cross-linked by heat and has a boiling point or range below 200° C based on blocked polyisocyanates, compounds and with active hydrogen atoms optionally the usual auxiliary agents and additives, characterized in that the blocked polyisocyanates consist to an extent of at least 40 equivalent percent of alkanol-blocked or cycloalkanol-blocked polyisocyanates.

DETAILED DESCRIPTION OF THE INVENTION

Suitable polyisocyanates for the process according to the invention which are used in a blocked form are, for example, aliphatic, cycloaliphatic, araliphatic, aromatic and heterocyclic polyisocyanates such as ethylene diisocyanate; tetramethylene diisocyanate; hexamethylene diisocyanate; dodecamethylene diisocyanate; cyclobutane-1,3-diisocyanate; cyclohexane-1,3- and -1,4-diisocyanate and any mixtures of these isomers; 1-isocyanato-3,3,5-trimethyl-5-isocyanatomethyl-cyclohexane; hexahydrotolylene-2,4- and -2,6-diisocyanate and any mixtures of these isomers; hexahydrophenylene-1,3- and/or 1,4-diisocyanate, phenylene-1,3- and -1,4-diisocyanate; tolylene-2,4- and -2,6-diisocyanate and any mixtures of these isomers; diphenylmethane-2,4'- and/or -4,4'-diisocyanate; naphthylene-1,5-diisocyanate; triphenylmethane-4,4',4''-triisocyanate; polyphenylpolymethylene polyisocyanates which can be obtained by aniline-formaldehyde condensation followed by phosgenation and which have been described e.g. in British patent specifications Nos. 874,430 and 848,671; perchlorinated aryl polyisocyanates such as those described e.g. in U.S. Pat. No. 3,277,138; polyisocyanates which contain carbodiimide groups as described in U.S. Pat. No. 3,152,162; diisocyanates of the kind described in U.S. Pat. No. 3,492,330; polyisocyanates which contain allophanate groups as described e.g. in British patent specification No. 994,890; Belgian Pat. No. 761,626 and published Dutch patent application No. 7,102,524; polyisocyanates which contain isocyanurate groups as described e.g. in German Pat. No. 1,022,789; 1,222,067 and 1,027,394 and in British Pat. No. 1,267,011 and in German Offenlegungsschrift No. 2,004,048; polyisocyanates which contain urethane groups as described e.g. in Belgian Pat. No. 752,261 or in U.S. Pat. No. 3,394,164; polyisocyanates which contain acylated urea groups in accordance with German Pat. No. 1,230,778; polyisocyanates which contain biuret groups as described e.g. in U.S. Pat. Nos. 3,124,605 and 3,201,372, British patent specification No. 889,050 and French Pat. No. 7,017,514; polyisocyanates prepared by telomerization reactions as described e.g. in Belgian Pat. No. 723,640; polyisocyanates which contain ester groups such as those mentioned e.g. in British patent specifications No. 956,474 and 1,072,956; U.S. Pat. No. 3,567,763 and German Pat. No. 1,231,688 and reaction products of the above mentioned isocyanates with acetylene in accordance with German Pat. No. 1,072,358.

The distillation residues which are obtained from the commercial production of isocyanates and still contain isocyanate groups may also be used, if desired as solutions in one or more of the above mentioned polyisocyanates. Any mixtures of the above mentioned polyisocyanates may also be used.

Polyisocyanates which are particularly advantageous to use in their blocked form are 2,4-diisocyanatotoluene; 2,6-diisocyanatotoluene; commercial mixtures of these isomers; 4,4'-diisocyanatodiphenylmethane; 4,4'-diisocyanatodiphenyl-dimethylmethane; 1,5-diisocyanatonaphthalene; mixtures of homologues or isomers of the kind which can be obtained in known manner by phosgenation of aniline/formaldehyde condensates; the triisocyanate containing urethane groups which can be obtained in known manner by reacting 3 mols of 2,4-diisocyanatotoluene with 1 mol of trimethylolpropane, and the isocyanato-isocyanurate which can be obtained in known manner by trimerizing 2,4-diisocyanatotoluene.

Other compounds with blocked isocyanate groups which are also suitable for the process according to the invention are imides, amidoimides, esterimides, ester amide imides, and esteramides of this kind which contain two or more carbamic acid ester groups. They are obtained by reacting an excess of the above mentioned, polyisocyanates which may be blocked, with compounds which in the case of ester amides or ester imides contain at least one isocyanate-reactive group per molecule and in the case of imidoimides or amidoimides at least two such groups; at least one cyclic anhydride configuration being necessary in the case of imides and at least one carboxyl group esterified or capable of being esterified with polyols being necessary in the case of the esters.

Polyvalent carboxylic acids such as pyromellitic acid; trimellitic acid; diphenyltetracarboxylic acid; ethylene tetracarboxylic acid; hydroxy- or amino-o-phthalic acid or bis-adducts of maleic acid or maleic acid anhydride with styrene are especially used for this purpose (see British Pat. No. 1,060,159 (U.S. Pat. No. 3,732,186)).

The proportion of compound with anhydride function to polyisocyanates may be widely varied, bearing in mind that the polyisocyanate may be used in equivalent quantity but is preferably used in excess with respect to the functional groups and that the resulting compounds are soluble in the melts according to the invention, optionally after they have been masked. It is immaterial whether these compounds are prepared by a solution process or solvent-free process.

Instead of the above mentioned polyisocyanates or blocked polyisocyanates, the process according to the invention could, in principle, also be carried out using the corresponding polyisothiocyanates or corresponding blocked polyisothiocyanates although these compounds are less advantageous.

In the process according to the invention, the above mentioned polyisocyanates are used in the masked form. In one preferred embodiment of the process of the invention the blocking agents consist of alkanols or cycloalkanols having one to three hydroxyl groups and a molecular weight of from about 32 to about 300. The preferred alkanol resp. cycloalkanol blocking agents have a boiling point at least 50° C below the boiling point of the compounds which are reacted with the blocked polyisocyanate. The following are examples of suitable blocking agents: Methanol; ethanol; propanol; isopropanol; n-butanol; tert.-butanol; isobutanol; pentanols; hexanols; cyclohexanol; benzyl alcohol; ethylene chlorohydrin; glycol monomethylether or glycol monoacetate; aliphatic diols or polyols such as ethylene glycol; diethylene glycol; propylene glycol; glycerol; trimethylolpropane or hexane triol.

According to another preferred embodiment of the process of the invention, mixtures of blocked polyisocyanates are used in which 40 to 99 equivalent percent of the polyisocyanates are blocked with alkanol or cycloalkanol and 60 to 1 equivalent percent are masked with blocking agents which split off at temperatures at least 30° C below the alkanols or cycloalkanols. The following are specific examples of such blocking agents: Phenol; cresols, ethyl-phenols; nitrophenols; lactams such as ε-caprolactam; CH-acidic compounds such as diethyl malonate; acetyl acetone or oximes such as cyclohexanone-ketoxime. Among the blocking agents which split off at a lower temperature it is particularly preferred to use phenols of the kind mentioned as examples.

The blocked polyiso(thio)cyanates can be prepared in known manner by reacting the polyiso(thio)cyanates with an equivalent quantity or excess of isocyanate blocking agent in the presence or absence of an inert solvent such as aromatic hydrocarbons, chlorinated hydrocarbons, ketones or esters at temperatures e.g. of 20° to 200° C. In the process according to the invention, the coating substances according to the invention may also be prepared by the one-pot process starting from the polyiso(thio)cyanate, adding the blocking agent, heating the mixture to the temperature of the blocking reaction and then adding the component having at least two active hydrogen atoms, preferably hydroxyl groups.

The blocked polyisocyanates used according to the invention which have been prepared from the polyisocyanates and blocking agents given as examples above generally have melting points or melting ranges below 190° C. When higher functional blocking agents are used, for example glycerol mentioned above, it is of course necessary to use monofunctional blocking agents at the same time in order to prevent the formation of highly cross-linked blocked isocyanate products which cannot be melted without decomposing.

The combinations used in the process according to the invention of the blocked polyisocyanates mentioned above and the compounds with active hydrogen atoms described as examples below generally have a mixed melting point or mixed melting range which is below the melting points or ranges of the individual components. Any further depression in melting point can be achieved by adding small quantities of inert substances, i.e. compounds which do not normally take part in the reaction, such as diphenyl; diphenylether; diphenylbenzene(1,4); dibenzylketone; benzophenone; acetophenone; naphthalene; cyclohexanone; polyolefines; polyacetates; polyesters or also ε-caprolactam and similar compounds or mixtures thereof. In principle, the usual solvents may be used in quantities for examples of up to 25% by weight, based on the total mixture, but it is preferred to work without solvents. In another embodiment of the invention, up to 100% by weight of solvent, based on the weight of solids, may be present.

The substances which are reacted with the blocked polyisocyanates in the process according to the invention are compounds which contain at least two preferably two to six active hydrogen atoms, preferably hydroxyl groups. These reactants preferably have molecular weight between about 62 and 10 000 and a boiling point at least 50° C above the boiling point of the blocking agent used. The following are examples of suitable reactants for the blocked polyisocyanates:

1. Low molecular weight polyols, i.e. with a molecular weight between 64 and 350, such as glycol; diethylene glycol; triethylene glycol; propylene glycol; dipropylene glycol; tripropylene glycol; butylene glycol; hexamethylenediol; dihydroxyethylethers or dihydroxypropylethers of bisphenols such as bisphenol A; the corresponding cycloaliphatic diols; glycerol; trimethylolpropane; trimethylolethane; hexanetriols; pentaerythritol or cycloaliphatic polyols such as the various quinitols or inositols; maleic acid bis-glycol esters; adipic acid bis-glycol esters; bis-glycol esters of benzene dicarboxylic acids; bis-glycol esters of naphthalene dicarboxylic acids, etc.;

2. Higher molecular weight polyols of a molecular weight between 350 and 10 000, e.g. polyhydroxypolyesters, i.e. with a molecular weight of, for example 350 to 5000, of the kind known per se in polyurethane chemistry, which are preferably obtained from dicarboxylic acids such as phthalic acid, hexahydrophthalic acid or adipic acid with excess quantities of diols of the kind mentioned as examples above, although trifunctional components may, of course, also be added if necessary to obtain the desired degree of branching; polyhydroxypolyethers within the above mentioned molecular weight range of the kind known per se in polyurethane chemistry which may be obtained by alkoxylation of low molecular weight starter molecules, for example, the low molecular weight polyols mentioned as examples above or water or amines which contain at least two active hydrogen atoms.

Furthermore polyamines, amino alcohols and thio alcohols within the above mentioned molecular weight range are applied as compounds which contain reactive hydrogen atoms for the combination with the blocked polyisocyanate, e.g. ethylene diamine, propylene diamine, 1.4-butylene diamine, anyline, o-, m- and p-diamino benzene, amino ethanol, amino propanol, mercapto ethanol. It also possible to apply amino groups containing polyethers having a molecular weight between 350 and 10 000. All these components are conventional and known in the art.

The macroscopic properties of the coatings finally obtained from the process according to the invention can easily be varied by suitable choice of the molecular weight of the active hydrogen compounds used. The use of higher molecular weight active hydrogen compounds generally results in softer coatings and low molecular weight polyhydroxyl compounds in harder coatings.

Other compounds apart from the above mentioned active hydrogen compounds which are also suitable for reaction with the blocked polyisocyanates in the process according to the invention include e.g. hydroxyl-containing epoxides, imidoesters; hydantoins, acrylates; hydroxyurethanes and the like. In the coating substances used according to the invention, the proportion of blocked polyisocyanate to reactant which contains active hydrogen groups is chosen so that the equivalent ratio of blocked isocyanate groups to active hydrogen atoms is between 9:1 and 1:2, preferably between 2:1 and 1:1.2. When using an excess of blocked isocyanate groups, the process according to the invention gives rise to additional cross-linking points which may be due, for example, to the reaction between the active hydrogen atoms of urethane bonds and the isocyanate groups. This frequently leads to an increase in the hardness of the sheets obtained according to the invention, which may be desirable in some cases. (Cross-linked end products may also be obtained from masked iso(thio)cyanates which have a higher valency than 2 and isocyanate-active reactants with a higher functionality than 2). Increase in the flexibility of the sheet obtained by the process according to the invention, which may be desirable in some cases, can be obtained by using excess quantities of hydroxyl compounds.

The combinations of blocked polyisocyanates and active hydrogen compounds used in the process according to the invention have a melting point or melting range below 200° C and preferably below 120° C.

Other polymer substances may also be used in the process according to the invention in quantities of up to 50% by weight, based on the total mixture, e.g. polyesters; polyamides; polyurethanes; polyethers; polyolefines; polyacetals; polyepoxides; polyimides; polyamidoimides; polyiminopolyesters. These materials may be added to the starting components or to the primary melt of this invention. When such polymers are added, however, it is necessary to ensure that the coating substance can still be melted at a temperature below the cross-linking temperature to a melt which has a viscosity of not more than 40,000 cP and preferably not more than 5000 cP.

To carry out the process according to the invention, the homogeneously mixed starting materials are worked up portionwise at temperatures of 20 to 250° C., preferably 80° to 180° C., to form a highly fluid, homogeneous melt. No increase in viscosity or spectroscopic changes can generally be found in these primary melts when kept within the given temperature range even after several weeks.

Coating is carried out within the given temperature range at a temperature at which the coating substance has a viscosity below 40,000 cP and preferably below 5000 cP.

Preparation of the primary melt may be modified by first melting one of the reactants, preferably the blocked polyisocyanate, and then slowly adding the other reactants until a clear solution is obtained. This is in most cases accompanied by a suprisingly high depression in melting point. When tested over a long term, the melts obtained in this way are found as expected to show the temperature/viscosity relationship already mentioned above and spectroscopic data of the reactants.

Short-chain oligomers can be produced by briefly heating the primary melts above the deblocking temperature of the masked polyisocyanates. These so-called tempered melts are unchanged in their advantageous temperature/viscosity characteristics but have additional advantages, for example, they can be applied more rapidly. In this embodiment of the process according to the invention, comprising brief heating of the primary melts to form oligomers, it is particularly advisable to employ the device already mentioned above of adding blocked polyisocyanates which have a lower deblocking temperature than the alkanol-blocked or cycloalkanol-blocked polyisocyanates. When the primary melt is briefly heated for oligomer formation, it is preferably raised to a temperature which lies above the deblocking temperature of that blocking agent which is split off at the lower temperature and below the deblocking temperature of the alkanol or cycloalkanol.

The reactants may also be reacted stepwise by first melting together or also partially reacting together, a part of the masked polyisocyanate and the total quantity of active hydrogen compounds or conversely and then supplementing the difference with the necessary equivalent quantities of the same or other reactants.

The subsequent processing technique employed for these highly fluid primary melts depends on the purpose for which they are intended to be used.

In principle, the melt may be cooled, crushed and if indicated again melted unchanged. It may also be powdered and used for EPS lacquering. Alternatively, the reactants may be mixed and melted on the site where they are used. The starting materials or liquid or solidified melts may, of course, also be used in solvents such as chlorobenzene, dichlorobenzene, halogenated aliphatic hydrocarbons, cyclohexanone, phenols and cresols or mixtures thereof or mixtures with diluents and applied as such or after partial or complete condensation of the substrate.

After application, which may in principle be carried out by any known lacquering technique such as dipping, spraying or coating, the coated substrates are exposed to elevated temperatures, preferably in stoving ovens, to complete the process of cross-linking of the coating. The temperatures of the ovens are generally between 150° and 700° C., preferably between 250° and 500° C. The coatings obtained in this way are temperature resistant as well as extremely resistant to chemical and physical agents.

The temperature in the stoving oven is generally sufficiently high to destablize the isocyanate and therefore bring about the cross-linking reaction although the reaction may be accelerated by the addition of the known catalysts used for polyurethane cross-linking reactions. The following are examples:

1. Tertiary amines such as triethylamine; tributylamine; N-methylmorpholine; N-ethylmorpholine; N-cocomorpholine; N,N,N',N'-tetramethyl-ethylenediamine; 1,4-diaza-bicyclo(2,2,2)-octane; N-methyl-N'-dimethylamino-ethyl-piperazine; N,N-dimethylbenzylamine; bis-(N,N-diethylaminoethyl)-adipate; N,N-diethylbenzylamine; pentamethyldiethylenetriamine; N,N-dimethylcyclohexylamine; N,N,N',N'-tetramethyl-1,3-butanediamine; N,N-dimethyl-β-phenylethylamine; 1,2-dimethylimidazole and 2-methyl-imidazole.

2. Tertiary amines which contain hydrogen atoms which are reactive with isocyanate groups, e.g. triethanolamine; triisopropanolamine; N-methyl-diethanolamine; N-ethyl-diethanolamine; N,N-dimethyl-ethanolamine and their reaction products with alkylene oxides such as propylene oxide and/or ethylene oxide.

3. Silaamines which contain carbon-silicon bonds (see German Patent Specification No. 1,229,290), e.g. 2,2,4-trimethyl-2-silamorpholine and 1,3-diethylaminomethyl-tetramethyldisiloxane.

4. Bases which contain nitrogen, such as tetraalkylammonium hydroxides and hexahydrotriazines.

5. Organic metal compounds, in particular compounds of iron, lead and/or tin. The organic tin compounds used are preferably tin(II) salts of carboxylic acids such as tin(II) acetate; tin(II) octoate; tin(II) ethyl hexoate and tin(II) laurate and dialkyl tin(IV) salts such as dibutyl tin dichloride; acetate; laurate or maleate, dioctyl-tin diacetate or dimethyl tin divalerate; also iron salts such as iron acetyl acetonate or iron chloride, lead oxide, lead carbonate or lead carboxylate.

6. Organic hydroxyl compounds such as phenol, cresols and chlorophenols, etc.

7. Phenol-Mannich bases (see Kunststoff Volume 62, page 731 (1972)), e.g. 2-(dimethylaminomethyl)-phenol and 2-(dimethylaminomethyl)-4-isononylphenol.

Other catalysts to be used according to the invention have been described in Kunststoff-Handbuch, Volume VII, published by Vieweg and Hochtlen, Carl-Hanser-Verlag, Munich 1966, on pages 96 to 102, and in High Polymers, Vol. XVI, Part I, (Polyurethanes-Chemistry), published by Saunders and Frisch, Interscience Publishers, New York 1962 on pages 129 to 217.

Organometallic catalysts and particularly organic tin catalysts were surprisingly found to have the effect of substantially increasing the velocity of regeneration and condensation of the isocyanate groups so that the reaction time could be shortened and, at the same time, the condensation and stoving temperature considerably reduced. This is important, for example, for complete hardening of the lacquer on the very fast running wire lacquering machines.

When using these catalysts, however, the interval between the melting and deblocking or condensation temperature may in individual cases be very narrow, in which case the operational reliability may be impaired.

One special feature of the process according to the invention therefore consists of the addition of so-called latent catalysts which, similar to the stabilized isocyanates, are liberated and therefore become active only above certain temperatures. The following are examples of such compounds:

1. Aromatic hydroxyl compounds and phenol-Mannich bases (see German Offenlegungsschrift No. 2,325,927), e.g. phenol, isomeric cresols, ethylphenols; xylenes; chlorophenols; methoxyphenols; nitrophenols; thiophenols; resorcinol; 2-(dimethylaminomethyl)-phenol and 2-(dimethylaminomethyl)-4-isononyl-phenol.

These compounds are preferably used in catalytic quantities in the form of blocking agents for the polyiso(thio)cyanates which may be in an inert form, and they release their activity at the same time that the isocyanate is regenerated by heat.

2. Quaternary ammonium salts of Mannich bases (see U.S. Pat. No. 2,950,262) such as 2-(trimethylammonium methyl)-cyclohexanone chloride.

3. Tertiary ammonium salts of organic acids such as triethylammonium trichloroacetate; bis-trimethylammoniumoxalate; N-ethylmorpholinium-acetate; N,N-dimethylbenzylammonium propionate; triethylenediammonium diacetate and bis-dimethylethanolammonium succinate.

4. Cyclic or bicyclic amidines such as 2,3-N-dimethyl-tetrahydro-$^1\Delta$-pyrimidine.

5. Organic metal compounds, in particular of lead and/or tin. Suitable organic lead compounds (see U.S. Pat. No. 3,474,075) are in particular tetraphenyl lead, tetra-ethyl lead, diphenyl lead diacetate and hexaphenyldi-lead.

Suitable tin compounds (see German Auslegeschrift No. 1,272,532 or U.S. Pat. No. 3,523,103) include tetra-n-butyl-1,3-diacetoxy-distannoxane, hexaphenyldi-tin and hexa-n-butyl di-tin.

The catalysts are generally used in a quantity of between 0.01 and 5.0% by weight, preferably 0.1 to 1.0% by weight, based on the blocked isocyanate compound. No detectable advantage is obtained by using larger quantities. In some cases, it is indicated to add the catalysts to the melts only immediately before application.

A particular embodiment of the process envisaged the partial use of amine compounds for blocking the polyisocyanates. The amines then liberated at high temperatures act as accelerators according to the invention. Compounds of this kind include, for example, dimethylamine; diethylamine; dibutylamine; diphenylamine; N-methyl-aniline; N-methylbenzylamine; pyrrolidine; piperidine; morpholine; pyrazole; imidazole and indole.

The usual additives and auxiliary agents used in the art of lacquering such as pigments, flue agents, dyestuffs, plasticizers and fillers may, of course, be added (in amounts from 0.05 to 20%, preferably 0.5 to 10% by weight, based on the total composition) in the process according to the invention.

The process according to the invention is particularly suitable for the production of temperature resistant coatings on metals, ceramics and glass fibers or fabrics. A preferred field of application for the process according to the invention is the production of wire lacquering by the known methods of dipping, roller application or suction felt application. The process is also particularly useful for producing insulating fabrics for electric motors because of the excellent electric and mechanical properties of the impregnated sheetings obtained by the process according to the invention.

The addition of suitable mold release agents, for example, can ensure that there is no adherence between the coated substrate and the film after hardening. On this basis, the process according to the invention may also be used for producing sheets.

EXAMPLE 1

750 Parts by weight of 4,4'-diisocyanato-diphenylmethane are added portionwise to 465 parts by weight of n-butanol and the mixture is stirred at 140°-145° C until the isocyanate absorption in the IR spectrum disappears. When cold, the solidified melt is crushed to a white powder which has a melting point of 118°-119° C after recrystallization from acetonitrile.

799 parts by weight of the resulting 4,4'-bis-butoxycarbonylaminodiphenylmethane are mixed with 316 parts by weight of 2,2-bis-[4-(2-hydroxy-ethoxy)-phenyl]propane and 89.3 parts by weight of 1,1,1-trimethylolpropane and worked up portionwise at 100° C to a clear, homogeneous, highly fluid melt. Its viscosity even after three weeks at about 120° C is only about 32 cP and at 150° C only 15 cP.

When cold, the solidified melt can easily be pulverized; melting point: 78° C.

About 500 parts by weight of this powder are introduced into a container which is similar to the usual lacquering vats used in wire lacquering machines but, in addition, can be heated directly and with temperature control to elevated temperatures.

The low viscosity melt obtained after heating to 120° C can be used directly for coating wires. A preheated copper wire 0.7 mm in diameter is coated with this melt by passing it three times through a vertical wire lacquering machine, the resulting increase in the diameter of the wire being 50 μm. The thickness of the film is adjusted by means of leather strippers. It is, of course, necessary to ensure that the supports of the stripper will also be kept at an elevated temperature so that the melt will not undergo changes in viscosity due to a fall in temperature. The length of the oven is 3 m, the oven temperature 400° C and the rate of passage of the wire through the oven is 7 m/min.

The tinning time of the resulting insulated wire in a soldering bath heated to 350° C is 4 to 5 seconds.

EXAMPLE 2

400 Parts by weight of a polyester which has been prepared by condensation of 1.6 mol of dimethylterephthalate, 1.2 mol of ethylene glycol and 0.8 mol of glycerol and which contains 6% by weight of hydroxyl groups are melted at about 80° C and while heated to a final temperature of 120° C and the polyester is worked up to a homogeneous, low viscosity melt of 6200 cP at 120° C by mixing it with 400 parts by weight of a difunctional carbamic acid ester with an isocyanate content of about 14% by weight which has been prepared from 1 mol of tolylene-diisocyanate (mixture of isomers 2,4 : 2,6 = 80:20), 2 mol of n-butanol and 0.5 mol of trimellitic acid anhydride. When solidified, the brittle material can easily be crushed.

500 parts by weight of the resulting mixture are introduced into a melting bath described in Example 1 and melted at 140° C. This melt is used to coat a copper wire 0.7 mm in diameter to a thickness corresponding to an increase in diameter of about 50 μm by passing the wire three times through the material.

The following conditions are observed:
Length of preheating zone of copper wire: 0.5 m
Temperature of preheating zone: 180° C
Length of oven shaft: 4 m
Temperature of oven shaft: 400° C
Number of immersions: 3
Gradation of the stripper nozzles: 0.730, 0.750, 0.760 mm.

The insulated wire obtained within the range of draw-off rates of 5 to 8 m/min has a softening point above 300° C and a thermal shock resistance (own diameter) of 200° C.

EXAMPLE 3

400 Parts by weight of 4,4'-diisocyanato-diphenylmethane,
110 parts by weight of polyphenylenemethylene polyisocyanate (31.6% by weight of isocyanate, approx. 70% of divalent and 30% by weight of trivalent and higher valent compounds $cP_{25°C} = 110$),
282 parts by weight of n-butanol and
22 parts by weight of m-cresol are gradually heated from 110° C to 140° C until no more free isocyanate groups can be detected in the IR spectrum.

508 parts by weight of bis-(2-hydroxyethyl)-terephthalate are then added portionwise at 120° C. A dark brown, low viscosity melt with a viscosity of 450 $cP_{120°C}$ is obtained.

A deep drawn metal sheet preheated to about the same temperature is coated by casting this melt on it. Hardening of the film is carried out in accordance with the following temperature cycle:
60 minutes at 250° C
5 minutes at 300° C.
The lacquer film obtained has good flexibility.

EXAMPLE 4

140 Parts by weight of 4,4'-bis-n-butoxycarbonylamino-diphenylmethane are melted at 120° C and
560 parts by weight of an epoxide compound with an epoxide equivalent weight of 1900 to 2200 prepared by reacting epichlorohydrin with diphenylolpropane are added portionwise at 120° to 130° C and the mixture is processed into a clear, homogeneous, light brown melt with a viscosity of 860 cP at 125° C. The typical bands of the oxazolidone ring cannot be seen in the IR spectrum of the melt. The material solidifies at about 60° C with marked increase in volume. It can easily be crushed.

A wire coated with the melt of this material heated to 125° C and otherwise treated by the method described in Example 2 has good flexibility and abrasion resistance.

EXAMPLE 5

1000 Parts by weight of an adduct of 1 mol of hexane-1,6-diol, 0.3 mol of 1,1,1-trimethylolpropane, 1.5% by weight of caprolactam and 1 mol of tolylene diisocyanate (mixture of isomers 2,4 : 2,6 = 80 : 20) having a hydroxyl content of 4% by weight are melted together with 60.3 parts by weight of 4,4'-bis-n-butoxycarbonylamino-diphenylmethane at 110° C and degasified for a short time at 160° C. A homogeneous, light yellow, clear, highly fluid melt which can easily be stirred is then left at 120° C. It has a viscosity of 270 cP at 120° C. It solidifies at 70° C to a plastics material which can easily be crushed at room temperature.

500 Parts by weight of the material prepared in this way are introduced into a melting bath described in Example 1 and melted at 130° C. 7 Parts by weight of an approximately 10% by weight solution of 2,3-N-dimethyltetrahydro-$^1\Delta$-pyrimidine in cresol are added to this melt which is then used to coat a copper wire which has a diameter of 1 mm by the method described in Example 2 but under the conditions which differ in the following respects from these specified in the said Example:
Temperature of oven shaft: 380° C
Gradation of the stripper nozzles: 1.025, 1.040, 1.060 mm. When the resulting coated copper wire is tested according to DIN 46,453, the following results are obtained:
Breakdown voltage: 5 kV
Resistance to scraping: about 60 double strokes
Softening temperature: about 200° C
Film hardness: 4 – 5 H

EXAMPLE 6

677 Parts by weight of di-N-butoxycarbonylamino-toluene (mixture of isomers 2,4 : 2,6 = 80 : 20),
60.1 parts by weight of 1,1,1-trimethylolpropane and
41.9 parts by weight of hexane-1,6-diol are melted together in powder form at about 85° C and then treated at 130° C with 583 parts by weight of a hydroxyurethane with a hydroxyl content of 6% by weight obtained from 1 mol of hexane-1,6-diol, 0.7 mol of 1,1,1-trimethylolpropane, 1.8% by weight of caprolactam and 1.3 mol of tolylene diisocyanate (mixture of isomers 2,4 : 2,6 = 80 : 20) to form a highly fluid melt which can easily be stirred. Its viscosity is about 320 cP at 105° C.

The material, which solidifies to a vitreous mass at about 30°C, can easily be crushed to a powder.

The melt heated to 120° C is used to coat a copper wire with a diameter of 0.7 mm as described in Example 1. The insulated lacquered wires obtained within the range of drawoff rates of 5–9 m/min have a resistance to scraping of about 50 double strokes, a film hardness of 5 H and a thermal shock resistance of 180° C (own diameter).

EXAMPLE 7

236 Parts by weight of hexane-1,6-diol are melted at 68° C and homogenized with
90 parts by weight of 1,1,1-trimethylolpropane and
10 parts by weight of caprolactam. The substance is then mixed with 322.4 parts by weight of di-n-butoxycarbonylaminotoluene (mixture of isomers 2,4 : 2,6 = 80 : 20) at 98° C and finally at 135° C with 699.9 parts by weight of an adduct of 1 mol of tolylene diisocyanate (mixture of isomer 2,4 : 2,6 = 80 : 20), 1.1 mol of phenol, 0.2 mol of 1,1,1-trimethylolpropane and 1.8 mol of butane-1,3-diol with a blocked isocyanate content of 12% by weight. After degasification, a clear, pale yellow, highly fluid melt with a viscosity of about 160 cP at about 80° C is obtained. The material, which becomes progressively more viscous with decreasing temperature, remains plastic at room temperature.

The melt heated to 105° C is used to coat a 0.3 mm copper wire by means of a system of rollers and stripper felts (also kept at this temperature).

When a 2 meter long oven adjusted to 370° C is used, an increase in diameter of 30 μm is obtained in three passages of the wire through the oven. The draw-off rates may be varied between 1.5 and 22 m/min. The coated wires produced in this way can be tinned in 3 seconds in a soldering bath heated to 330° C.

EXAMPLE 8

396 Parts by weight of 1,4-bis-(2-hydroxy-ethoxy)-benzene, 149 parts by weight of 1,1,1-trimethylolpropane, 36.9 parts by weight of diethyleneglycol and 10 parts by weight of caprolactam are melted together at 90° C and mixed with 818 parts by weight of 4,4'-bis-n-butoxycarbonylamino-diphenylmethane and 548 parts by weight of 4,4'-bis-ethoxycarbonylamino-diphenylmethane at 100° C and finally with 175 parts by weight of 4,4'-bis-phenoxycarbonylamino-diphenylmethane at 85° C to form a clear, homogeneous, highly fluid melt with a viscosity of about 50 cP at 85° C. The material, which solidifies at 65°-68° C, can be crushed to a white powder at room temperature.

An insulated wire produced under the conditions described in Example 7 can withstand a thermal shock treatment at 200° C. It can also be stretched by 20% and then wound round a mandrel of its own diameter before being subjected to a thermal shock treatment at 130° C without any cracks appearing.

EXAMPLE 9

299 Parts by weight of bis-(2-hydroxyethyl)-terephthalate, 84.8 parts by weight of diethylene gylcol, 253.5 parts by weight of tris-(2-hydroxyethyl)-isocyanurate and 20 parts by weight of caprolactam are processed at 125° C to form a clear, highly fluid melt. This is then mixed with 936.4 parts by weight of 4,4'-bis-n-butoxycarbonylaminodiphenylmethane and 306.9 parts by weight of 4,4'-bis-phenoxycarbonylaminodiphenylmethane at 110° C, the mixture is degasified for a short time at 150° C, and finally 2.4 parts by weight of 4,4'-bis-N,N'-diethylaminocarbonylaminodiphenylmethane are added at 130° C. A very thin, homogeneous, clear melt is obtained which has a viscosity of about 150 cP at 80° C. The material, which has an ointment-like consistency from a temperature of 64° C, solidifies at room temperature to a white, brittle product and can easily be crushed to a powder.

A copper wire 0.7 mm in diameter is coated with the melt heated to 100° C under the conditions indicated in Example 1. In this example, the rate of passage through the oven can be increased to 8-9 m/min. The coated wire obtained has a softening temperature of 220° C and a pencil hardness of 5 H.

EXAMPLE 10

255 Parts by weight of a polyester of 1.6 mol of dimethyl terephthalate, 1.2 mol of ethylene glycol and 0.8 mol of glycerol containing 6% by weight of hydroxyl groups are melted at 85° C and while the temperature is gradually raised to 160° C 740 parts by weight of a hydroxyurethane of 1 mol of hexane-1,6-diol, 0.7 mol of 1,1,1-trimethylolpropane, 1.8% by weight of caprolactam and 1.3 mol of tolylene diisocyanate (mixture of isomers 2,4 : 2,6 = 80 : 20) with a hydroxyl content of 6% by weight are added and the mixture is degasified. It is then mixed at 140° C with 470 parts by weight of an isocyanurate which contains polycarbamic acid ester groups and has an isocyanate content (blocked) of 16.5% by weight, which isocyanurate has been prepared by trimerizing 1 mol of tolylene diisocyanate (mixture of isomers 2,4 : 2,6 = 80 : 20) in the presence of 1.1 mol of n-butanol, and with 30.5 parts by weight of a polyisocyanate with a blocked isocyanate content of 8.1% by weight which has been prepared from 2.6 mol of 4,4'-diisocyanatodiphenylmethane, 2.9 mol of phenol, 0.9 mol of 1,1,1-trimethylolpropane and 0.4 mol of butane-1,3-diol, and the mixture is degasified for a short time at 150° C. A slightly viscous melt with a viscosity of 7800 cP at 130° C is obtained.

The product is already tough and elastic and difficult to stir at 90° C and solidifies to a vitreous mass at 60° C. It can be crushed to a powder.

Preheated metal sheets are coated with this melt heated to 140° C by dipping them into the melt and they are then stoved at 230° C for 30 minutes and finally briefly exposed to temperatures of 300° C.

Alternatively, the dipped metal sheets may also be placed on to a conveyor belt and moved at the rate of 12 - 36 m/min past a high frequency source of induction heating of the type HG/6SIH 6 kw manufactured by Siemens, output 12 kVA, and hardened directly.

The resulting coating adheres firmly to its substrate and has a pencil hardness of 5 H.

EXAMPLE 11

135.8 Parts by weight of hexane-1,6-diol and 216 parts by weight of bis-(2-hydroxyethyl)-terephalate are melted together at 80° C and mixed portionwise, first with 171.2 parts by weight of 4,4'-bis-ethoxycarbonylamino-diphenylmethane and 398.5 parts by weight of 4,4'-bis-n-butoxycarbonylaminodiphenylmethane at 110° C, then with 46.7 parts by weight of 4,4'-bis-cresoxycarbonylamino-diphenylmethane at 130° C and finally at 140° C with 204 parts by weight of an isocyanurate which contains carbamic acid ester groups and 16.5% by weight of isocyanate (blocked) and which has been obtained by trimerizing 1 mol of tolylenediisocyanate (mixture of isomers 2,4 : 2,6 = 80 : 20) in the presence of 1.1 mol of n-butanol to form a homogeneous mixture.

The mixture is rapidly degasified at 140° C and then constitutes a very thin, watery, almost colorless melt which has a viscosity of about 115 cP at 70° C. It acquires an ointment-like or plastic consistency at about 408° C and solidifies at about 40° C to a brittle product which can easily be crushed.

A preheated wire spool produced according to VDE 0360, page 21, is dipped into the melt which has been heated to 120° C and a light vacuum is applied. After removal from the bath, the spool is stoved in a heating bath, starting at 120° C. The temperature is increased to 250° C in the course of 2 hours. The spool is kept at this temperature for a further 8 hours.

The impregnated spool obtained in this way has a baking number of 3.1 at 135° C when tested according to VDE 0360, page 21.

EXAMPLE 12

163.8 Parts by weight of hexane-1,6-diol, 35.2 parts by weight of 1,4-bis-(2-hydroxy-ethoxy)-benzene and 45.1 parts by weight of 1,1,1-trimethylolpropane are together crushed to a powder and melted to form a clear melt at 70° C.

23.9 Parts by weight of 4,4'-bis-methoxycarbonylaminodiphenylmethane and 677.4 parts by weight of 4,4'-bis-n-butoxycarbonylaminodiphenylmethane are added portionwise at 110° C and then at 130° C are added 171.8 parts by weight of an isocyanurate which contains carbamic acid ester groups and has a blocked isocyanate content of 16.5% by weight and which has been obtained by trimerizing 1 mol of tolylene diisocyanate (mixture of isomers 2,4 : 2,6 = 80 : 20) in the presence of 1.1 mol of butanol. At 145° C, 28.2 parts by weight of an analogous isocyanurate which has a blocked isocyanate content of 14.0% by weight and which has been obtained by trimerizing 1 mol of tolylene diisocyanate (mixture of isomer 2,4 : 2,6 = 80 : 20) in the presence of 1.4 mol of phenol, are then added.

The melt, which is a very thin liquid at 100° C, has a viscosity of only about 110 cP even at 80° C. It solidifies at 70° C to form a greasy mass which, however, is completely hard from 60° C onwards. The material can easily be pulverized at room temperature.

The powder may be used directly for coatings. It is immaterial whether the powder is obtained directly by grinding the dry, mixed starting materials or by pulverizing the solidified primary melt. In either case, the powder can be used to produce a glossy film or coating with high surface hardness in a stoving cycle of 30 minutes at 240° C and 15 minutes at 300° C, for example, after application to a metal sheet.

EXAMPLE 13

580 Parts by weight of a polyester of 1.6 mol of dimethyl terephthalate, 1.2 mol of ethylene glycol and 0.8 mol of glycerol with a hydroxyl content of 6% by weight and 76 parts by weight of an isocyanurate which contains carbamic acid ester groups and has a blocked isocyanate content of 16.5% by weight and has been prepared by trimerizing 1 mol of tolylene diisocyanate (mixture of isomers 2,4 : 2,6 = 80 : 20) in the presence of 1.1 mol of n-butanol are melted together to form a homogeneous melt at 150° C and worked up at 145° C with 103.6 parts by weight of 4,4'-bis-n-butoxycarbonylaminodiphenylmethane and 25 parts by weight of 4,4'-bis-cresoxycarbonylaminodiphenylmethane to form a slightly viscous melt. This can be completely degasified by heating it for a short time to 170°–175° C. Its viscosity at 135° C is about 1450 $cP_{135°C}$.

The melt becomes progressively more viscous from 100° C onwards, is plastic at 70° C and brittle and glass-like at room temperature. It can be processed into a white powder.

A melt of these products heated to 150° C is used to coat a copper wire 0.7 mm in diameter by the process described in Example 1.

The conditions differ from those observed in Example 1 as follows:

The oven length is 4 meters, the oven temperature 420° C.

The draw-off rate may be varied between 7 and 11 m/min. The insulated wire obtained has a softening temperature of 310° C and a pencil hardness of 4 H.

EXAMPLE 14

775 Parts by weight of a polyester of 5 mols of adipic acid, 1 mol of phthalic acid anhydride and 8 mol of 1,1,1-trimethylolpropane with a hydroxyl content of 8.8% by weight are worked up at 160° C with 445 parts by weight of a bifunctional carbamic acid ester which contains isocyanurate rings and has a blocked isocyanate content of 13.6% by weight and has been obtained by trimerizing a mixture of 2 mols of tolylene diisocyanate (mixture of isomers 2,4 : 2,6 = 80 : 20) and 1 mol of phenylisocyanate in the presence of 2,2 mol of n-butanol, and at 140° C with 36.5 parts by weight of 4,4'-bis-phenoxycarbonylamino-diphenylmethane to form a homogeneous, clear, slightly viscous melt. Its viscosity at 100° C is about 780 $cP_{100°C}$. It solidifies at room temperature to form a plastic clear substance.

A spool is dipped into the melt heated to 120° C in accordance with VDE 0360 as described in Example 11, and then stoved.

The resulting spool tested according to VDE 0360, page 21, has a baking number of 3.3 at 130° C.

This melt can also be used in a casting apparatus to apply a film of a given thickness to a heat resistant support made of metal, glass or the like from which the film is easily removed when finished. The finished film can be lifted from its substrate after condensation and hardening of the material at 250° C for 60 minutes and 300° C for 5 minutes. Sheets produced in this way have good mechanical properties and high heat resistances.

EXAMPLE 15

500 Parts by weight of a polyester of 4.3 mol of adipic acid, 2 mol of hexane-1,6-diol and 1.8 mol of neopentyl glycol having a hydroxy content of 1.65% by weight are melted at 40° C and worked up into a melt by mixing it at 140° C with 175 parts by weight of an isocyanurate which contains carbamic acid ester groups and has an isocyanate content (blocked) of 16.5% by weight, prepared by trimerizing 1 mol of tolylene diisocyanate (mixture of isomers 2,4 : 2,6 = 80 : 20) in the presence of 1.1 mol of n-butanol and 50 parts by weight of an analogous isocyanurate which contains 14.0% by weight of blocked isocyanate groups and has been obtained by trimerizing 1 mol of tolylene diisocyanate (mixture of isomers 2,4 : 2,6 = 80 : 20) in the presence of 1.4 mol of phenol.

After degasifying the mixture for a short time at 160° C, a very thin, homogeneous, clear melt is obtained which has a viscosity of only 370 cP even at 70° C. Although the melt is slightly more viscous at room temperature, it can still be stirred and applied.

An iron sheet preheated to 100° C is coated by casting the melt also preheated to 100° C on it, and the coated sheet is then hardened by high frequency induction heating as indicated in Example 10.

A very flexible coating which adheres firmly to its support is obtained.

EXAMPLE 16

500 Parts by weight of a polyester of 1.6 mol of dimethyl terephthalate, 1.2 mol of ethylene glycol and 0.8 mol of glycerol with a hydroxyl content of 6% by weight are treated at 130° C with 400 parts by weight of a condensation product of 1 mol of tolylene-2,4-diisocyanate, 1 mol of ethylene glycol and 1 mol of trimellitic acid anhydride in 100 parts by weight of cresol to form a homogeneous, easily stirrable melt with a viscosity of 9700 cP at 130° C.

This melt, which is already plastic at about 90° C, solidifies to a vitroeous mass at about 70° C. The material can be crushed to a powder at room temperature.

500 Parts by weight of a mixture prepared in this way are introduced into a melting bath described in Example 1 and melted at 140° C. This material is used to coat a copper wire 7 mm in diameter by passing it three times through the bath to obtain an increase in diameter of about 80 μm. Before entering the melting bath, the wire is passed through a preheating zone 0.5 mm in length and heated to 160° C.

Other conditions are as follows:
Length of oven shaft: 4 meters
Temperature of oven shaft: 400° C
Number of immersions: 3
Gradation of stripper nozzles: 0.750, 0.760, 0.780 mm.

The insulated wire obtained within a range of draw-off rates of 5 to 8 m/min has a softening point above 300° C, a thermal shock resistance of about 200° C, a pencil hardness of about 4 H and a breakdown voltage of 6.7 kV.

What is claimed is:

1. Process of coating a heat resistant substrate comprising applying a solvent-free melt coating composition comprising blocked polyisocyanates and compounds which contain hydroxyl groups which are reactive with isocyanate groups, followed by cross-linking of the resulting coating by heating wherein
   a. at least 40 equivalent percent of the blocked polyisocyanates consist of alkanol or cycloalkanol blocked polyisocyanates,
   b. the blocked polyisocyanates and compounds which contain hydroxyl groups reactive with isocyanate groups form a composition with a melting point or range below 200° C and the proportion of reactants is so chosen that the equivalent ratio of blocked isocyanate groups to hydroxyl groups is between 1:2 and 9:1,
   c. coating of the substrate is carried out at a temperature within the range of 20° to 250° C at which temperature the coating composition has a substantially constant viscosity of not more than 40,000 cP, and
   d. the coated substrate is subsequently heated to a temperature at which the blocking agent is split off and final cross-linking takes place.

2. Process according to claim 1, wherein
   a. the substrate to be coated is a metal wire and
   b. coating is carried out by dipping, roller application or suction felt coating.

3. Process according to claim 1 wherein the compound which contains hydroxyl groups reactive with isocyanate groups is a compound containing at least two hydroxyl groups.

4. The process according to claim 3, wherein the compound having at least two hydroxyl groups has a molecular weight of about 62 to about 10 000.

5. Process according to claim 1 wherein the blocked polyisocyanates consist of 40 to 99 equivalent percent of alkanol- or cycloalkanol- blocked polyisocyanates and 1 to 60 equivalent percent of blocked polyisocyanates which have a deblocking temperature at least 30° C below the deblocking temperature of the alkanol- or cycloalkanol- blocked polyisocyanates.

6. Process according to claim 5 wherein the blocked polyisocyanates which have a deblocking temperature at least 30° C below the deblocking temperature of the alkanol- or cycloalkanol- blocked polyisocyanates are phenol- blocked polyisocyanates.

7. Process according to claim 5 wherein before the substrate is coated, the coating composition is briefly heated to a temperature which lies above the deblocking temperature of the blocked polyisocyanates which have a deblocking temperature at least 30° C below the blocking temperature of the alkanol- or cycloalkanol- blocked polyisocyanates and below the deblocking temperature of the alkanol- or cycloalkanol- blocked polyisocyanates to produced oligomer formation in the coating composition.

8. Process of coating a heat resistant substrate comprising
   a. providing a melt of a solvent-free coating substance comprising
      i) at least 50% by weight of a combination of blocked polyisocyanates and polyhydroxyl compounds having a melting point or melting range below about 200° C and having an equivalent ratio of blocked isocyanate groups to hydroxyl groups of about 1:2 to about 9:1, said blocked polyisocyanates characterized in that at least 40 equivalent percent of the blocked polyisocyanates consist of alkanol or cycloalkanol blocked polyisocyanates, and
      ii) up to 50% by weight of polymeric substances not substantially reactive with said hydroxyl groups,
   b. coating a heat resistant substrate with the coating substance at a temperature of about 20° to 250° C and at a substantially constant viscosity of not more than about 40,000 cP, and
   c. heating the coated substrate to a temperature sufficiently high to cause the polyisocyanate blocking agent to split off.

9. A process of coating a heat resistant substrate comprising
   a. providing a melt of a coating substance comprising
      i) at least 50% by weight of a combination of blocked polyisocyanates and polyhydroxyl compounds having a melting point or melting range below about 200° C and having an equivalent ratio of blocked isocyanate groups to hydroxyl groups of about 1:2 to about 9:1, about 40 to 99 equivalent percent of said blocked polyisocyanates being alkanol or cycloalkanol blocked and about 60 to 1 equivalent percent of said blocked polyisocyanates having a deblocking temperature at least about 30° C below the deblocking temperature of the alkanol or cycloalkanol blocked polyisocyanates, ii) up to 50% by weight of polymeric substances not substantially reactive with said hydroxyl groups, b. coating a heat resistant substrate with said coating substance which is at about 20° to 250° C and has a substantially constant viscosity of not more than about 40,000 cP, and c. heating the coated substrate to a temperature sufficiently high to cause the isocyanate blocking agent to split off, whereby a cross-linked coating is formed.

10. The process of claim 9 wherein a. prior to coating the heat resistant substrate, the coating substance is briefly heated to a temperature which lies above the deblocking temperature of the blocked polyisocyanates which have a deblocking temperature at least 30° C below the deblocking temperature of the alkanol- or cycloalkanol-blocked polyisocyanates and below the deblocking temperature of the alkanol- or cycloalkanol-blocked polyisocyanates to produce oligomer formation in the coating substance, and b. the coating substance has a substantially constant viscosity of not more than 5000 cP at a temperature between 20° and 250° C.

11. A coating composition which can be cross-linked by heat and has a melting point or range below 200° C comprising blocked polyisocyanates and polyhydroxyl compounds, wherein at least 40 equivalent percent of the blocked polyisocyanates consist of alkanol- or cycloalkanol-blocked polyisocyanates, said composition having a substantially constant viscosity of not more than 40,000 cP at a temperature between about 20° C and 250° C, and the polyisocyanates being selected from the group consisting of 2,4-diisocyanatotoluene, 2,6-diisocyanatotoluene, mixtures of 2,4- and 2,6-diisocyanatotoluene, 4,4'-diisocyanatodiphenylmethane, 4,4'-diisocyanatodiphenyl - dimethylmethane, 1,5-diisocyanatonaphthalene, mixtures of homologues or isomers obtained by phosgenation of aniline/formaldehyde condensates, the triisocyanate containing urethane groups obtained by reacting 3 mols of 2,4-diisocyanatotoluene with 1 mol of trimethylolpropane and the isocyanato-isocyanurate obtained by trimerizing 2,4-diisocyanatotoluene.

12. A coating composition which can be cross-linked by heating comprising i. at least 50% by weight of a combination of blocked polyisocyanates and polyhydroxyl compounds having a melting point or melting range below about 200° C and having an equivalent ratio of blocked isocyanate groups to hydroxyl groups of about 1:2 to about 9:1, about 40 to 99 equivalent percent of said blocked polyisocyanates being alkanol or cycloalkanol blocked and about 60 to 1 equivalent percent of said blocked polyisocyanates having a deblocking temperature at least about 30° C below the deblocking temperature of the alkanol or cycloalkanol blocked polyisocyanate, and ii. up to 50% by weight of polymeric substances not substantially reactive with said hydroxyl groups.

13. A coating composition which can be cross-linked by heating to a sufficient temperature comprising i. at least 50% by weight of a combination of blocked polyisocyanates and polyhydroxyl compounds having a melting point or melting range below about 200° C and having an equivalent ratio of blocked isocyanate groups to hydroxyl groups of about 1:2 to about 9:1, about 40 to 99 equivalent percent of said blocked polyisocyanates being alkanol or cycloalkanol blocked and about 60 to 1 equivalent percent of said blocked polyisocyanates having a deblocking temperature at least about 30° C below the deblocking temperature of the alkanol or cycloalkanol blocked polyisocyanates, and ii. up to 50% by weight of polymeric substances not substantially reactive with hydroxyl groups in which constituents (i) and (ii) together having a substantially constant viscosity of not more than 40,000 cP at a temperature between about 20° C and 250° C.

14. The coating composition of claim 12 wherein up to 25% by weight of solvent, based on the total mixture, is present.

15. The coating composition of claim 13 wherein up to 25% by weight of solvent, based on the total mixture, is present.

16. The coating composition of claim 12 wherein up to 100% by weight of solvent, based on the weight of solids, is present.

17. The coating composition of claim 13 wherein up to 100% by weight of solvent, based on the weight of solids, is present.

* * * * *